United States Patent
Futahashi et al.

(10) Patent No.: US 10,724,551 B2
(45) Date of Patent: Jul. 28, 2020

(54) HYDRAULIC OIL TANK FOR POWER GENERATION SYSTEM AND METHOD FOR SEALING HYDRAULIC OIL IN SAID HYDRAULIC OIL TANK

(71) Applicant: MITSUBISHI HEAVY INDUSTRIES, LTD., Tokyo (JP)

(72) Inventors: Kensuke Futahashi, Tokyo (JP); Shin Asano, Tokyo (JP); Yoshitomo Noda, Tokyo (JP); Sho Onodera, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 157 days.

(21) Appl. No.: 15/760,168

(22) PCT Filed: Sep. 23, 2016

(86) PCT No.: PCT/JP2016/077985
§ 371 (c)(1),
(2) Date: Mar. 14, 2018

(87) PCT Pub. No.: WO2017/051857
PCT Pub. Date: Mar. 30, 2017

(65) Prior Publication Data
US 2018/0266444 A1 Sep. 20, 2018

(30) Foreign Application Priority Data
Sep. 25, 2015 (JP) .................................. 2015-187625

(51) Int. Cl.
*F15B 1/26* (2006.01)
*F03B 17/06* (2006.01)
(Continued)

(52) U.S. Cl.
CPC ................ *F15B 1/26* (2013.01); *F03B 11/00* (2013.01); *F03B 13/10* (2013.01); *F03B 13/12* (2013.01);
(Continued)

(58) Field of Classification Search
CPC .......... F15B 1/265; F15B 1/26; F15B 21/045; F01P 11/029
(Continued)

(56) References Cited

U.S. PATENT DOCUMENTS 3,003,659 A * 10/1961 Miller .................... B67D 1/045
220/722
3,076,479 A 2/1963 Ottung
(Continued)

FOREIGN PATENT DOCUMENTS

| CN | 35202372 U | 7/1986 |
|---|---|---|
| CN | 201412469 Y | 2/2010 |

(Continued)

OTHER PUBLICATIONS

Office Action for Chinese Application No. 201680054048.8 dated May 10, 2019; 21pp.
(Continued)

*Primary Examiner* — Jeffrey R Allen
(74) *Attorney, Agent, or Firm* — Kanesaka Berner and Partners, LLP

(57) ABSTRACT

This hydraulic oil tank, which is disposed inside a pod of a power generation system, stores hydraulic oil, wherein the hydraulic oil tank is provided with: a rubber bag for use during oil temperature increases, the rubber bag being attached to a tank wall surface from the inner side, having a first internal space communicated with the exterior through an opening passing through the wall surface, and partitioning the first internal space and the wall surface interior in an (Continued)

elastic manner; and a rubber bag for use during oil temperature decreases, the rubber bag being attached to the wall surface from the outer side, having a second internal space communicated with the wall surface interior through an opening passing through the wall surface, and partitioning the second internal space and the wall surface interior in an elastic manner.

14 Claims, 8 Drawing Sheets

(51) Int. Cl.
  *F03B 11/00* (2006.01)
  *F03B 13/26* (2006.01)
  *F03B 13/12* (2006.01)
  *F03B 13/10* (2006.01)
  *F03D 15/00* (2016.01)
  *F15B 21/045* (2019.01)
  *F03D 9/25* (2016.01)

(52) U.S. Cl.
  CPC .......... *F03B 13/264* (2013.01); *F03B 17/061* (2013.01); *F03D 9/25* (2016.05); *F03D 15/00* (2016.05); *F05B 2260/406* (2013.01); *F15B 21/045* (2013.01); *Y02E 10/22* (2013.01)

(58) Field of Classification Search
  USPC ................................ 220/702, 721, 722, 723
  See application file for complete search history.

(56) References Cited

U.S. PATENT DOCUMENTS

| | | | |
|---|---|---|---|
| 4,527,580 | A | 7/1985 | Chheda |
| 5,979,481 | A * | 11/1999 | Ayresman .............. B60K 15/03 137/14 |
| 9,175,664 | B2 | 11/2015 | Fievez et al. |
| 2018/0266444 | A1 | 9/2018 | Futahashi et al. |

FOREIGN PATENT DOCUMENTS

| | | |
|---|---|---|
| CN | 102568762 A | 7/2012 |
| CN | 103112599 A | 5/2013 |
| CN | 108026941 A | 5/2018 |
| JP | S35-10397 Y1 | 5/1935 |
| JP | S47-22390 U | 11/1972 |
| JP | H6-307495 A | 11/1994 |
| JP | H7-151102 A | 6/1995 |
| JP | 2005299902 A | 10/2005 |
| TW | 233486 | 11/1994 |
| TW | M358210 U | 6/2009 |
| TW | M362921 U | 8/2009 |
| TW | 201228880 A1 | 7/2012 |
| TW | 201445047 A | 12/2014 |

OTHER PUBLICATIONS

Office Action in TW Application No. 105130849 dated Nov. 9, 2017. 8pp.
International Search Report and Written Opinion in PCT/JP2016/077985 dated Dec. 20, 2016. 18pp.

\* cited by examiner

HYDRAULIC OIL TANK FOR POWER GENERATION SYSTEM AND METHOD FOR SEALING HYDRAULIC OIL IN SAID HYDRAULIC OIL TANK

RELATED APPLICATIONS

The present application is a National Phase of PCT International Application Number PCT/JP2016/077985, filed Sep. 23, 2016, which claims priority of Japanese Application No. 2015-187625, filed Sep. 25, 2015.

TECHNICAL FIELD

The present invention relates to a hydraulic oil tank for a power generation system which generates power by utilizing marine current energy, tidal energy, or wind energy, and to a method of sealing hydraulic oil in the hydraulic oil tank.

BACKGROUND ART

A marine current power generation system which generate power by utilizing marine current energy, a tidal power generation system which generates power by utilizing tidal energy, and a wind power generation system which generates power by utilizing wind energy each have such a configuration that a power generator, a hydraulic drive train, and a hydraulic oil tank are disposed in a pod and a bladed rotor is disposed outside the pod.

As an example, the marine current power generation system is illustrated in FIG. 9A and FIG. 9B. Note that FIG. 9A is an arrangement diagram of the marine current power generation system and FIG. 9B is an enlarged schematic diagram of the marine current power generation system.

As illustrated in FIG. 9A, the marine current power generation system 100 is configured as a floating body with a certain fixed buoyancy and floats in the sea within a certain range by being tethered to an anchor cable extending from the seafloor. A marine current thus causes the marine current power generation system 100 to oscillate.

Moreover, as illustrated in FIG. 9B, in the marine current power generation system 100, a power generator 102, a hydraulic drive train 103, and a hydraulic oil tank 104 are disposed inside a pod 101 and a bladed rotor 105 is disposed outside the pod 101. The bladed rotor 105 is connected to the power generator 102 via the hydraulic drive train 103 and the hydraulic drive train 103 increases the number of revolutions of the bladed rotor 105 to the number of revolutions of the power generator 102. Moreover, the hydraulic oil tank 104 is a tank for storing the hydraulic oil used in the hydraulic drive train 103 and is connected to the hydraulic drive train 103. The hydraulic drive train 103 sucks and circulates the hydraulic oil in the hydraulic oil tank 104 by using a pump incorporated therein.

In the marine current power generation system 100, the bladed rotor 105 is thereby rotated by the marine current energy and the power generator 102 is rotated via the hydraulic drive train 103 to generate power.

PRIOR ART DOCUMENT

Patent Document

Patent Document 1: Japanese Patent Application Publication No. Hei 7-151102

SUMMARY OF THE INVENTION

Problems to be Solved by the Invention

The hydraulic oil tank 104 has the following technical problems [1] to [3]. Note that FIG. 10A to FIG. 10C described below are schematic diagrams for explaining the problems of the hydraulic oil tank 104. In FIG. 10A and FIG. 10B, bold arrows indicate flow of the hydraulic oil and "work" means work of increasing the number of revolutions in the hydraulic drive train 103 as described above.

[1] As described above, since the marine current power generation system 100 is installed in the sea, a marine current causes the marine current power generation system 100 to oscillate. As indicated by the double-headed one-dot chain line arrows in FIG. 10A, this oscillation causes the liquid surface of the hydraulic oil in the hydraulic oil tank 104 to oscillate and air bubbles are caught in the hydraulic oil (sloshing phenomenon). This induces cavitation in a pump and a valve of the hydraulic drive train 103 and desired performances cannot be obtained.

[2] When a gas phase in the hydraulic oil tank 104 is eliminated by filling the inside of the hydraulic oil tank 104 with the hydraulic oil to prevent the aforementioned problem [1], expansion (or shrinking) of the hydraulic oil caused by a temperature change as illustrated by small arrows in FIG. 10B causes the pressure in the tank to change and this leads to deformation and breakage of the hydraulic oil tank 104. In order to prevent the deformation of the hydraulic oil tank 104, the plate thickness of the tank needs to be increased and the weight and cost of the system increase.

[3] Alongside the aforementioned problems [1] and [2], there is a risk that the temperature in the pod 101 becomes high due to heat generated in the hydraulic drive train 103 and the hydraulic oil tank 104 and a device failure is induced. A temperature increase in the pod 101 can be suppressed by additionally providing a cooling system which cools the hydraulic drive train 103 and the hydraulic oil tank 104. However, this leads to increases in weight and cost of the system and to a decrease of maintainability due to an increase in the number of devices included in the system.

Note that the aforementioned technical problems are common among the tidal power generation system whose configuration is substantially the same as that of the marine current power generation system except for the attachment means (anchor cable 110 described above) for the power generation system, and the wind power generation systems such as offshore and airborne wind power generation systems.

In view of the technical problems described above, an object of the present invention is to provide a hydraulic oil tank for a power generation system which can be prevented from being deformed when being filled with hydraulic oil, without changing a plate thickness of the tank and which can perform cooling without being additionally provided with a cooling system, and to a method of sealing hydraulic oil in the hydraulic oil tank.

Means for Solving the Problems

A hydraulic oil tank according to a first aspect of the present invention to solve the problem above is the hydraulic oil tank which stores hydraulic oil, characterized in that the hydraulic oil tank includes: a first expanding-shrinking portion attached to a tank wall surface from an inner side and having a first internal space communicating with an outside through a first opening passing through the wall surface, the first expanding-shrinking portion separating the first internal space and an inside of the wall surface from each other while being able to expand and shrink; and a second expanding-shrinking portion attached to the wall surface from an outer side and having a second internal space communicating with the inside of the wall surface through a second opening passing through the wall surface, the second expanding-shrinking portion separating the second internal space and the outside of the wall surface from each other while being able to expand and shrink.

A hydraulic oil tank according to a second aspect of the present invention to solve the problem above is the hydraulic oil tank according to the first aspect, characterized in that the first expanding-shrinking portion and the second expanding-shrinking portion are rubber bags having the first opening and the second opening, respectively.

A hydraulic oil tank according to a third aspect of the present invention to solve the problem above is the hydraulic oil tank according to the second aspect, characterized in that the second expanding-shrinking portion is disposed in a side surface portion of the wall surface and has a tubular shape, and one end of the second expanding-shrinking portion which is the second opening passing through the side surface portion and the other end of the second expanding-shrinking portion which is a third opening passing through the side surface portion are attached to locations shifted from each other in a vertical direction.

A hydraulic oil tank according to a fourth aspect of the present invention to solve the problem above is the hydraulic oil tank according to the second aspect, characterized in that the second expanding-shrinking portion is disposed as part of a side surface portion of the wall surface and the second opening is formed to extend along an entire periphery of the side surface portion.

A hydraulic oil tank according to a fifth aspect of the present invention to solve the problem above is the hydraulic oil tank according to the fourth aspect, characterized in that a weight is provided in an upper portion of a tank ceiling.

A hydraulic oil tank according to a sixth aspect of the present invention to solve the problem above is the hydraulic oil tank according to the first aspect, characterized in that the first expanding-shrinking portion and the second expanding-shrinking portion are bellows having the first opening and the second opening, respectively.

A hydraulic oil tank according to a seventh aspect of the present invention to solve the problem above is the hydraulic oil tank according to the sixth aspect, characterized in that the second expanding-shrinking portion is disposed in a side surface portion of the wall surface and has a tubular shape, and one end of the second expanding-shrinking portion which is the second opening passing through the side surface portion and the other end of the second expanding-shrinking portion which is a third opening passing through the side surface portion are attached to locations shifted from each other in a vertical direction.

A hydraulic oil tank according to an eighth aspect of the present invention to solve the problem above is the hydraulic oil tank according to the sixth aspect, characterized in that the second expanding-shrinking portion is disposed as part of a side surface portion of the wall surface and the second opening is formed to extend along an entire periphery of the side surface portion.

A hydraulic oil tank according to a ninth aspect of the present invention to solve the problem above is the hydraulic oil tank according to the eighth aspect, characterized in that a weight is provided in an upper portion of a tank ceiling.

A hydraulic oil tank according to a tenth aspect of the present invention to solve the problem above is the hydraulic oil tank according to the first aspect, characterized in that the first expanding-shrinking portion is a first tubular body in which a first piston separates an air chamber, being the first internal space communicating with the outside through the first opening, from an oil chamber communicating with the inside of the wall surface through a fifth opening passing through the wall surface, and the second expanding-shrinking portion is a second tubular body in which a second piston separates an oil chamber, being the second internal space communicating with the inside of the wall surface through the second opening, from an air chamber communicating with the outside through a sixth opening passing through the wall surface.

A hydraulic oil tank according to an eleventh aspect of the present invention to solve the problem above is the hydraulic oil tank according to any one of the first to tenth aspects, characterized in that which is disposed in a pod of the power generation system, and a tank bottom surface is in tight contact with a wall surface of the pod or is part of the wall surface of the pod.

A hydraulic oil tank according to a twelfth aspect of the present invention to solve the problem above is the hydraulic oil tank according to the eleventh aspect, characterized in that a portion including the tank bottom surface is an enlarged diameter portion having a diameter larger than that in other portions.

A hydraulic oil tank according to a thirteenth aspect of the present invention to solve the problem above is the hydraulic oil tank according to the twelfth aspect, characterized in that a pipe which is a circulation route of the hydraulic oil is connected to the enlarged diameter portion.

A hydraulic oil sealing method according to a fourteenth aspect of the present invention to solve the problem above is the the hydraulic oil sealing method characterized in that the method includes sealing hydraulic oil with the second expanding-shrinking portion of the hydraulic oil tank according to any one of second to fifth aspects, being crushed from the outside or evacuated.

Effect of the Invention

In the hydraulic oil tank for a power generation system and the method of sealing the hydraulic oil in the hydraulic oil tank according to the present invention, the tank can be prevented from being deformed when being filled with the hydraulic oil, without changing a plate thickness of the tank. Moreover, cooling can be performed without additionally providing a cooling system.

MODE FOR CARRYING OUT THE INVENTION

Figure 9A:
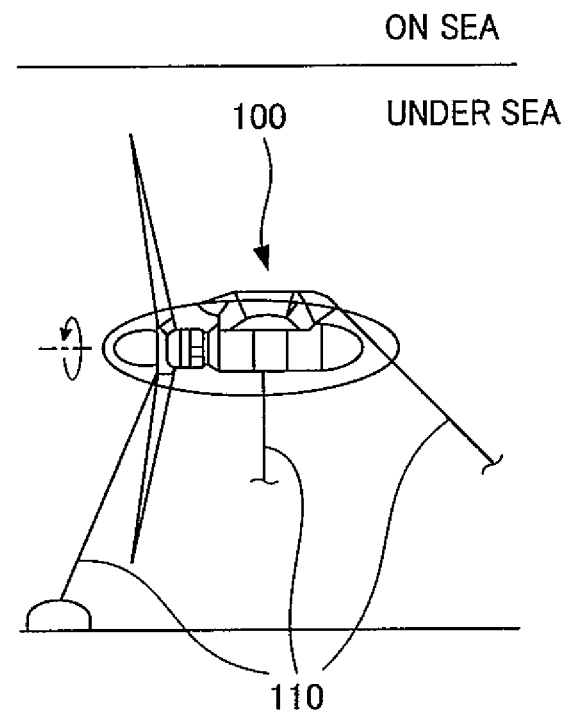
FIG. 9A is an arrangement diagram of the power generation system and FIG. 9B is an enlarged schematic diagram of the power generation system.
Figure 9B:
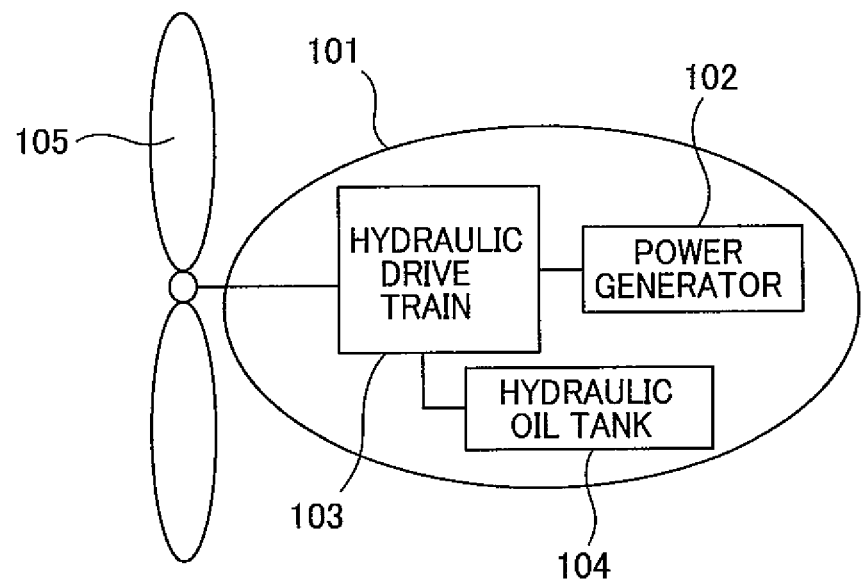
Figure 10A:
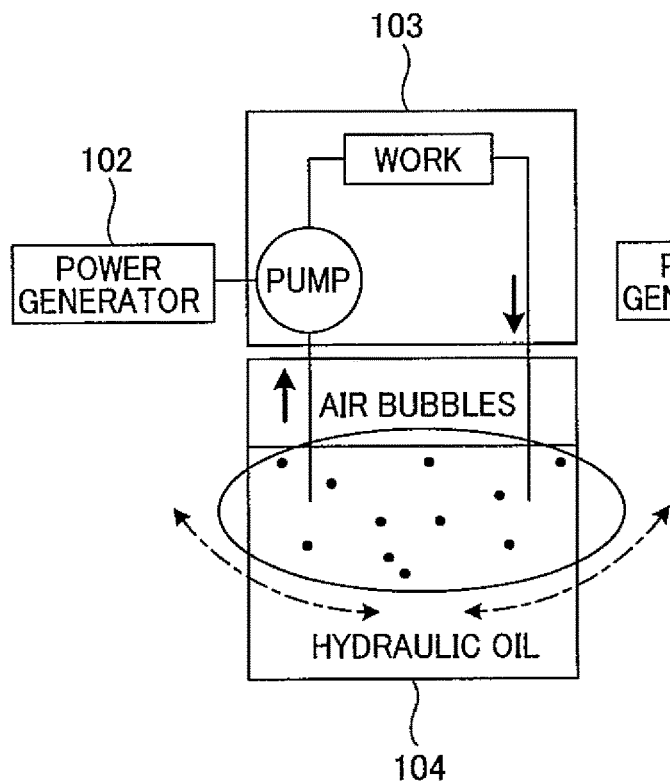
FIG. 10A to FIG. 10C are a schematic diagrams for explaining problems of a conventional hydraulic oil tank for the power generation system.
Figure 10B:
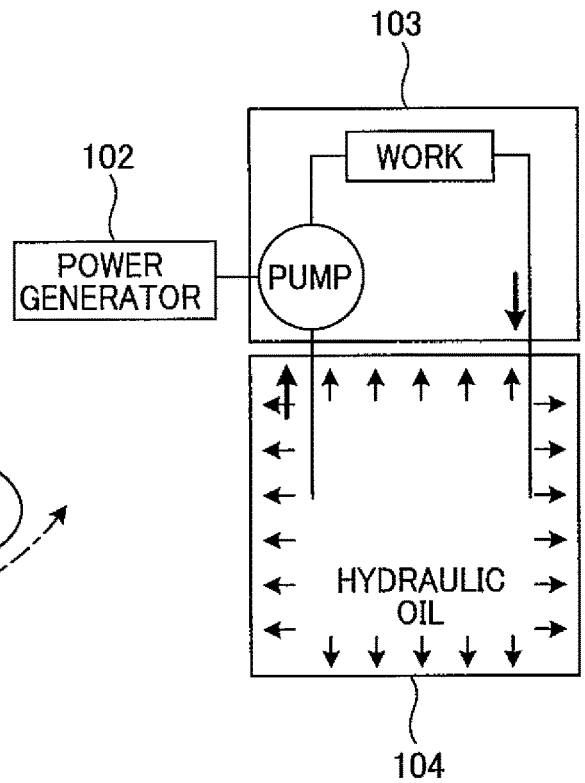
Figure 10C:
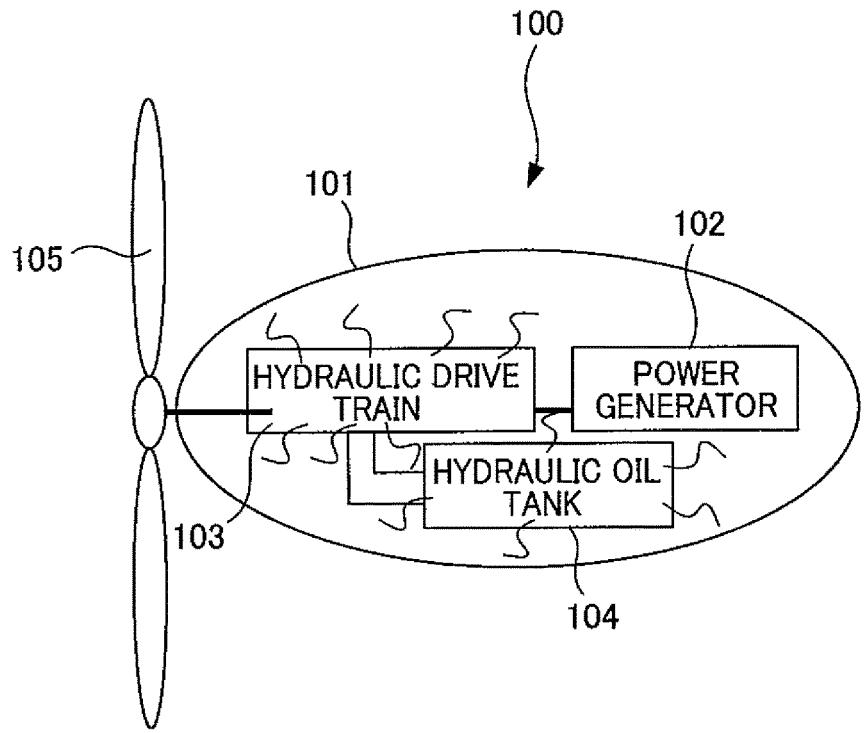

A hydraulic oil tank for a power generation system according to the present invention is disposed in a pod (see the pod 101 in FIGS. 9B and 10C) of a power generation system such as a marine current power generation system, a tidal power generation system, or a wind power generation system which oscillates, and is a hydraulic oil tank for storing hydraulic oil. The hydraulic oil tank for the power generation system according to the present invention and a method of sealing the hydraulic oil in the hydraulic oil tank are described below in the embodiments by using the drawings.

Embodiment 1

Figure 1:
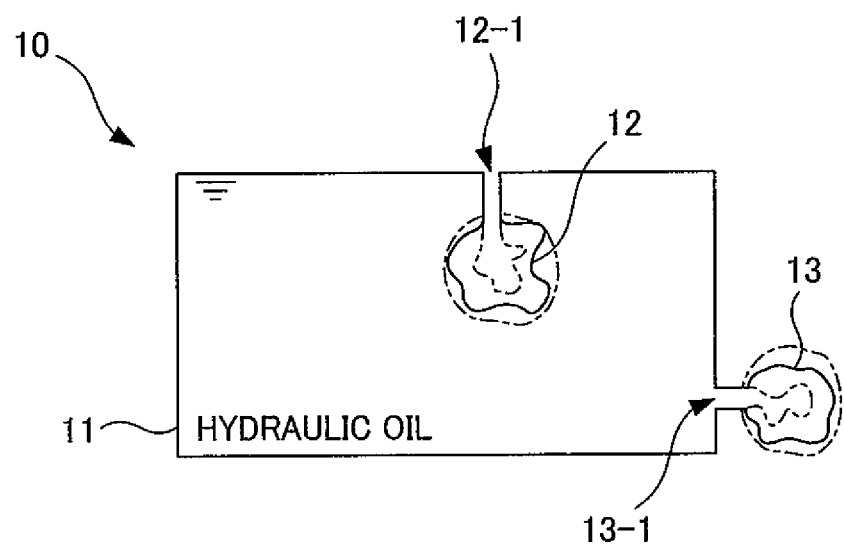
FIG. 1 is a schematic cross-sectional diagram of a hydraulic oil tank for a power generation system according to Embodiment 1 of the present invention.

As illustrated in the schematic diagram of FIG. 1, a hydraulic oil tank (hydraulic oil tank 10) for a power generation system according to Embodiment 1 includes an oil temperature rise rubber bag 12 and an oil temperature drop rubber bag 13 on a tank wall surface 11, and an inside of the tank wall surface 11 is filled with hydraulic oil. Moreover, although illustration thereof is omitted in the embodiment, the inside of the hydraulic oil tank 10 communicates with a hydraulic drive train (see the hydraulic drive train 103 in FIGS. 9B and 10A to 10C, the same applies hereafter) via a suction pipe and a return pipe, and the temperature of the hydraulic oil in the hydraulic oil tank 10 rises by being circulated to the hydraulic drive train.

The oil temperature rise rubber bag 12 (first expanding-shrinking portion) which can expand and shrink is attached to the tank wall surface 11 from the inner side and an inner space (first inner space) thereof communicates with an outside of the tank wall surface 11 through an opening 12-1 (first opening) passing through the tank wall surface 11. Moreover, the oil temperature drop rubber bag 13 (second expanding-shrinking portion) which can expand and shrink is attached to the tank wall surface 11 from the outer side and an inner space (second inner space) thereof communicates with the inside of the tank wall surface 11 through an opening 13-1 (second opening) passing through the tank wall surface 11.

Note that, although FIG. 1 illustrates a state where the oil temperature rise rubber bag 12 is disposed on a ceiling of the tank wall surface 11 and the oil temperature drop rubber bag 13 is disposed on a side surface of the tank wall surface 11, the locations where the rubber bags 12, 13 are disposed on the tank wall surface 11 are not necessary limited to these.

In this configuration, when the hydraulic oil expands due to oil temperature rise, the oil temperature rise rubber bag 12 mainly shrinks as illustrated by the two-dot chain line in FIG. 1 to absorb an oil volume change and the pressure in the hydraulic oil tank 10 is maintained to be constant. In this case, (although less than the change in the oil temperature rise rubber bag 12) the oil temperature drop rubber bag 13 slightly expands as illustrated by the one-dot chain line of FIG. 1 to assist the absorbing of the oil volume change.

Moreover, when the hydraulic oil shrinks due to oil temperature drop, the oil temperature drop rubber bag 13 mainly shrinks as illustrated by the two-dot chain line in FIG. 1 to absorb the oil volume change and the pressure in the hydraulic oil tank 10 is maintained to be constant. In this case, (although less than the change in the oil temperature drop rubber bag 13) the oil temperature rise rubber bag 12 slightly expands as illustrated by the one-dot chain line of FIG. 1 to assist the absorbing of the oil volume change.

Accordingly, even in a state where the inside of the hydraulic oil tank 10 is filled with the hydraulic oil, providing the rubber bags 12, 13 can prevent deformation of the hydraulic oil tank 10 which occurs when the temperature of the hydraulic oil changes, without the plate thickness of the tank wall surface 11 being increased, and the weight and cost of the system can be reduced.

Next, description is given of a method of sealing the hydraulic oil in the hydraulic oil tank for the power generation system according to the embodiment. First, the oil temperature rise rubber bag 12 and the oil temperature drop rubber bag 13 are joined to the hydraulic oil tank 10. The air in the oil temperature drop rubber bag 13 is discharged by crushing the rubber bag from the outside or by evacuating the rubber bag. The hydraulic oil is sealed in this state. The hydraulic oil can be thus sealed in the hydraulic oil tank 10 without air accumulation being formed in the oil temperature drop rubber bag 13.

Assume a case where only one rubber bag is provided. In this case, when the hydraulic oil is to be sealed in the hydraulic oil tank, a compression amount of the rubber bag needs to be adjusted in consideration of a volume change of the hydraulic oil caused by the temperature change thereof.

Figure 2A:
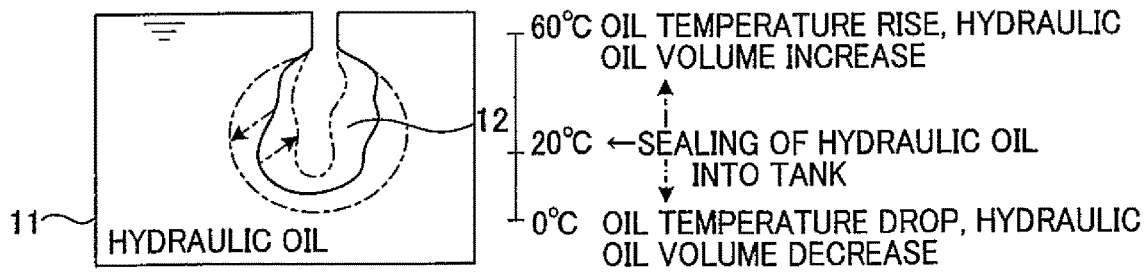
FIG. 2A is a schematic cross-sectional diagram for explaining, as an example, setting of an expanding-shrinking amount of an oil temperature rise rubber bag in the case where only the oil temperature rise rubber bag is provided.
Figure 2B:
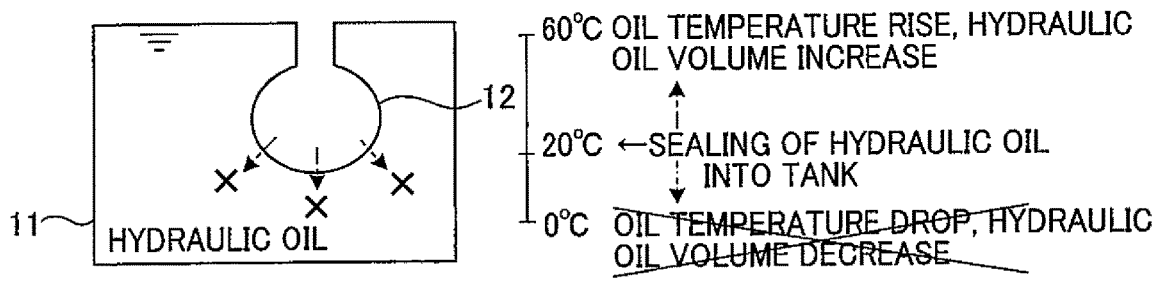
FIG. 2B is a schematic cross-sectional diagram for explaining actual expanding and shrinking of the oil temperature rise rubber bag in the case where only the oil temperature rise rubber bag is provided.

FIG. 2A is a schematic cross-sectional diagram for explaining, as an example, setting of the expanding-shrinking amount of the oil temperature rise rubber bag 12 in the case where only the oil temperature rise rubber bag 12 is provided. As illustrated in FIG. 2A, the temperature of the hydraulic oil may be, for example, 20° C. in the sealing into the hydraulic oil tank, but changes due to drive, stop, and the like of the power generation system (for example, the temperature fluctuates within a range of 0° C. to 60° C. as illustrated in FIG. 2A and FIG. 2B). The two-dot chain line in FIG. 2A illustrates a state where the rubber bag 12 shrinks in the oil temperature rise, that is in the oil volume increase, and the one-dot chain line illustrates a state where the rubber bag 12 expands in the oil temperature drop, that is in the oil volume decrease.

In an environment in which the power generation system is used, the oil temperature rises or drops and the oil amount in the hydraulic oil tank increases or decreases from an initial amount. Meanwhile, as illustrated in FIG. 2A, setting the expanding-shrinking amount of the single rubber bag in view of the amount of volume change of the hydraulic oil to be caused by the temperature change thereof is not easy at the time of pouring and sealing the hydraulic oil into the hydraulic oil tank, because of the configuration of the devices.

FIG. 2B is a schematic cross-sectional diagram for explaining, as an example, actual expanding and shrinking of the oil temperature rise rubber bag 12 in the case where only the oil temperature rise rubber bag 12 is provided. As described above, in actuality, the expanding-shrinking amount cannot be accurately set and, for example, there may occur a case where, as illustrated in FIG. 2B, the rubber bag 12 expands to its limit while the temperature of the hydraulic oil is dropping and the volume thereof is decreasing, and cannot expand any more.

Figure 2C:
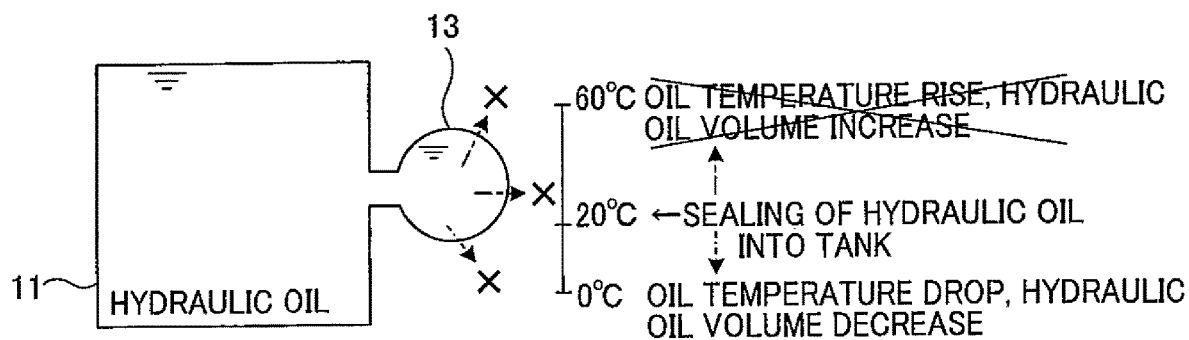
FIG. 2C is a schematic cross-sectional diagram for explaining actual expanding and shrinking of an oil temperature drop rubber bag in the case where only the oil temperature drop rubber bag is provided.

Although the case where only the oil temperature rise rubber bag 12 is provided is described above, similar problems occur when only the oil temperature drop rubber bag 13 is provided as illustrated in FIG. 2C. Specifically, FIG. 2C illustrates a state where the rubber bag 13 expands to its limit while the temperature of the hydraulic oil is rising and the volume thereof is increasing, and cannot expand any more.

Meanwhile, in the sealing of the hydraulic oil into the hydraulic oil tank 10, the hydraulic oil tank 10 can be easily filled with the hydraulic oil without considering the volume change of the hydraulic oil caused by the temperature change thereof. As a result, a gas phase in the tank which causes sloshing can be eliminated.

The hydraulic oil tank 10 is not limited to one including the rubber bags 12, 13. Modified examples (hydraulic oil tanks 10a, 10b) of the hydraulic oil tank 10 are described by using FIGS. 3 and 4.

Figure 3:
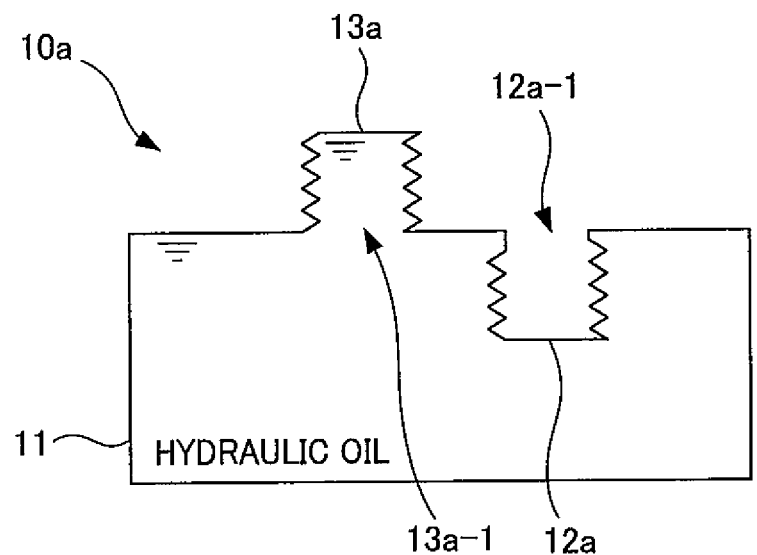
FIG. 3 is a schematic cross-sectional diagram for explaining a modified example of the hydraulic oil tank for the power generation system according to Embodiment 1 of the present invention.

The hydraulic oil tank 10a illustrated in FIG. 3 includes an oil temperature rise bellows 12a and an oil temperature drop bellows 13a. Moreover, the inside of the tank wall surface 11 is filled with the hydraulic oil.

The oil temperature rise bellows 12a (first expanding-shirking portion) which can expand and shrink is attached to the tank wall surface 11 from the inner side and an inner space (first inner space) of the bellows communicates with the outside of the tank wall surface 11 through an opening 12a-1 (first opening) passing through the tank wall surface 11. Moreover, the oil temperature drop bellows 13a (second expanding-shrinking portion) which can expand and shrink is attached to the tank wall surface 11 from the outside and an inner space (second inner space) of the bellows communicates with the inside of the tank wall surface 11 through an opening 13a-1 (second opening) passing through the tank wall surface 11.

In this configuration, when the hydraulic oil expands due to the oil temperature rise, the oil temperature rise bellows 12a mainly shrinks to absorb the oil volume change and the pressure in the hydraulic oil tank 10a is maintained to be constant. In this case, (although less than the change in the oil temperature rise bellows 12a) the oil temperature drop bellows 13a slightly expands to assist the absorbing of the oil volume change.

Moreover, when the hydraulic oil shrinks due to the oil temperature drop, the oil temperature drop bellows 13a mainly shrinks to absorb the oil volume change and the pressure in the hydraulic oil tank 10 is maintained to be constant. In this case, (although less than the change in the oil temperature drop bellows 13a) the oil temperature rise bellows 12a slightly expands to assist the absorbing of the oil volume change.

Figure 4:
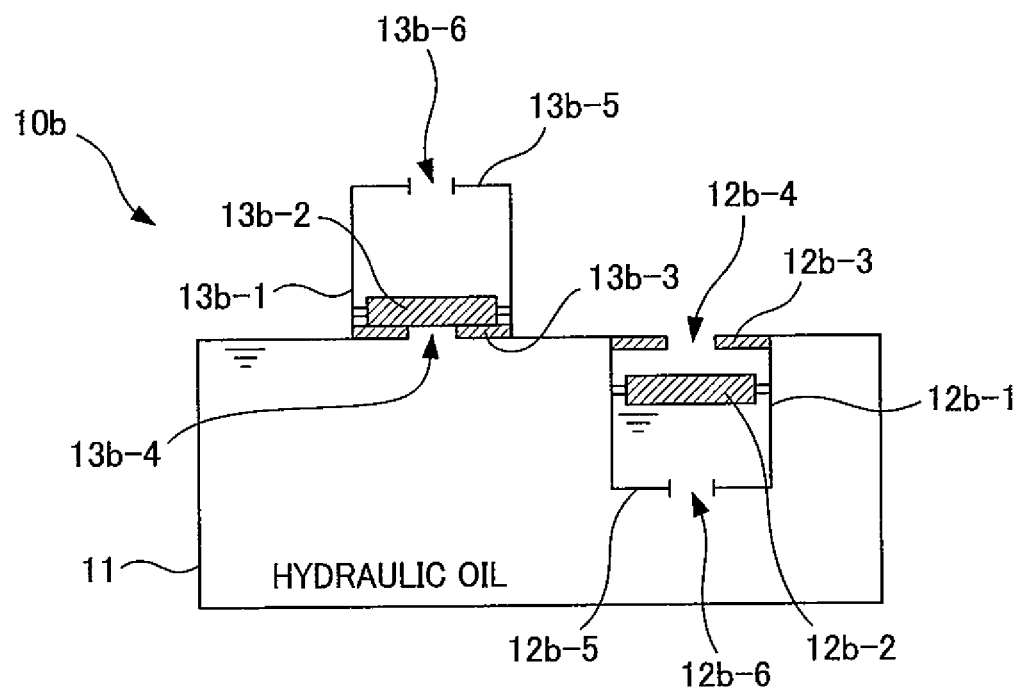
FIG. 4 is a schematic cross-sectional diagram for explaining another modified example of the hydraulic oil tank for the power generation system according to Embodiment 1 of the present invention.

In the hydraulic oil tank 10b illustrated in FIG. 4, there are disposed a tubular body 12b-1 (first expanding-shrinking portion) which is attached to the tank wall surface 11 from the inner side and which has a first piston 12b-2 therein and a tubular body 13b-1 (second expanding-shrinking portion) which is attached to the tank wall surface 11 from the outside and which has a second piston 13b-2 therein. The inside of the tank wall surface 11 is filled with the hydraulic oil and FIG. 4 illustrates, as an example, a state where the hydraulic oil shrinks.

The tubular body 12b-1 includes an end surface 12b-3 which is one end of the tubular body 12b-1 and which is formed in the tank wall surface 11, a hole 12b-4 (first opening) formed in the end surface 12b-3, an end surface 12b-5 which is the other end of the tubular body 12b-1, and a hole 12b-6 (fifth opening) formed in the end surface 12b-5. The first piston 12b-2 is provided to be in tight contact with an inner peripheral surface of the tubular body 12b-1 and to be movable in an axial direction. The first piston 12b-2 divides the inside of the tubular body 12b-1 into an air chamber (first inner space) which communicates with the outside through the hole 12b-4 and an oil chamber which communicates with the inside of the tank wall surface 11 through the hole 12b-6 and which is filled with the hydraulic oil.

The tubular body 13b-1 includes an end surface 13b-3 which is one end of the tubular body 13b-1 and which is formed in the tank wall surface 11, a hole 13b-4 (second opening) formed in the end surface 13b-3, an end surface 13b-5 which is the other end of the tubular body 13b-1, and a hole 13b-6 (sixth opening) formed in the end surface 13b-5. The second piston 13b-2 is provided to be in tight contact with an inner peripheral surface of the tubular body 13b-1 and to be movable in an axial direction. The second piston 13b-2 divides the inside of the tubular body 13b-1 into an air chamber which communicates with the outside through the hole 13b-6 and an oil chamber (second inner space) which communicates with the inside of the tank wall surface 11 through the hole 13b-4 and which is filled with the hydraulic oil. Note that FIG. 4 illustrates, as an example, a state where the second piston 13b-2 is in contact with the end surface 13b-3 and it appears as if there is no oil chamber.

Just after the sealing of the hydraulic oil, the first piston 12b-2 is in contact with the end surface 12b-3 and the second piston 13b-2 is in contact with the end surface 13b-3. When the hydraulic oil expands due to the temperature rise, the air chamber in the tubular body 13b-1 shrinks (that is, the oil chamber expands) to absorb the oil volume change in the hydraulic oil tank 10b and the pressure in the hydraulic oil tank 10b is maintained to be constant. Moreover, when the hydraulic oil shrinks due to the temperature drop, the air chamber in the tubular body 12b-1 expands (that is, the oil chamber shrinks) to absorb the oil volume change in the hydraulic oil tank 10b and the pressure in the hydraulic oil tank 10b is maintained to be constant.

Embodiment 2

Figure 5A:
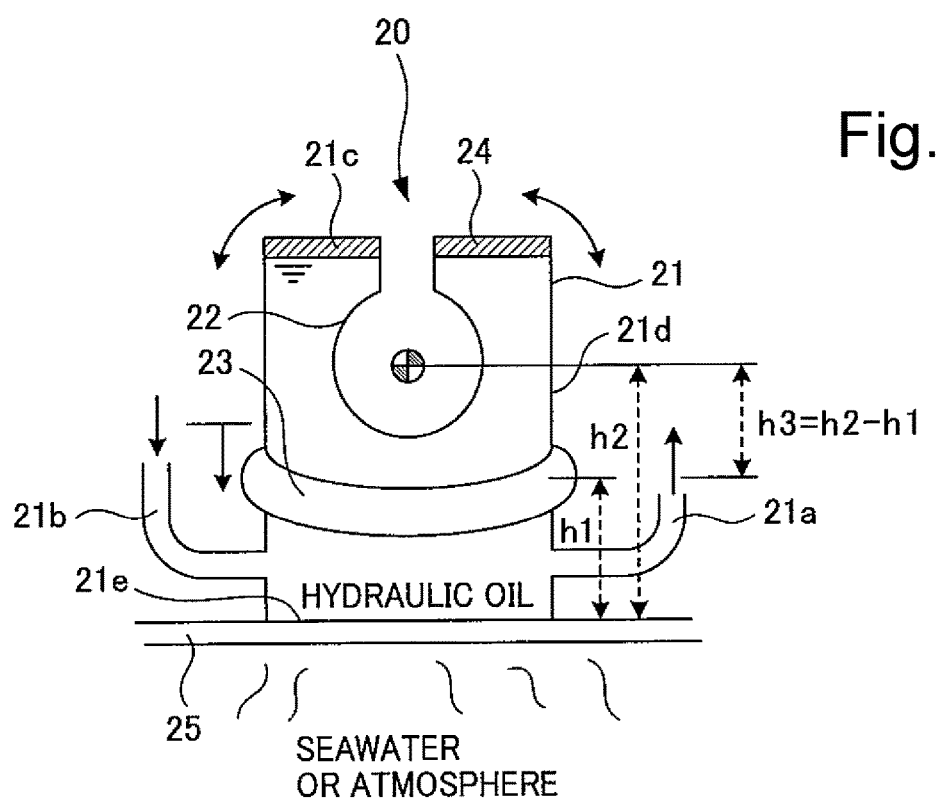
FIG. 5A is a schematic diagram for explaining a hydraulic oil tank for a power generation system according to Embodiment 2 of the present invention (which is partially illustrated as a cross-sectional diagram)

FIG. 5A is a schematic diagram for explaining a hydraulic oil tank (hydraulic oil tank 20) for a power generation system according to Embodiment 2 (the diagram is partially illustrated as a cross-sectional diagram for clarity). The hydraulic oil tank 20 includes an oil temperature rise rubber bag 22 and an oil temperature drop rubber bag 23 on a tank wall surface 21, and an inside of the tank wall surface 21 is filled with hydraulic oil. Note that double-headed solid arrows in FIG. 5A indicate how the hydraulic oil tank 20 oscillates (due to oscillation of the power generation system caused by a marine current, force of a tide, or a force of a wind).

The oil temperature rise rubber bag 22 is the same as the oil temperature rise rubber bag 12 in Embodiment 1 and is disposed particularly on a ceiling 21c of the tank wall surface 21 in this example. The oil temperature drop rubber bag 23 corresponds to the oil temperature drop rubber bag 13 in Embodiment 1 but is disposed as part of the wall (rubber wall) in a side surface 21d of the tank wall surface 21, and an opening (not illustrated) corresponding to the opening 13-1 in Embodiment 1 is formed to extend along the entire periphery of the side surface 21d. Moreover, the specifications of the oil temperature drop rubber bag 23 are such that the rubber bag 23 can support an upper portion of the tank and withstand ejection pressure of a pump (pump in the hydraulic drive train).

Moreover, in the hydraulic oil tank 20, a weight 24 is disposed on an upper surface of the ceiling 21c. Note that, as illustrated in FIG. 5A, the weight 24 has an opening at a location corresponding to a portion where the oil temperature rise rubber bag 22 communicates with the outside of tank wall surface 21 so that the oil temperature rise rubber bag 22 can communicate with the outside. Moreover, the weight 24 is provided such that a relationship between height h1 from a bottom surface 21e of the tank wall surface 21 to the oil temperature drop rubber bag 23 and height h2 of the center of gravity of the tank satisfies h2>h1.

In the hydraulic oil tank 20, the oil temperature rise rubber bag 22 and the oil temperature drop rubber bag 23 thus operate like the oil temperature rise rubber bag 12 and the oil temperature drop rubber bag 13 in Embodiment 1. In addition, even if the pod (see the pod 101 in FIG. 10C) oscillates with a gas phase mixed into the hydraulic oil tank 20, an oscillation damping effect of the oil temperature drop rubber bag 23 (as well as the oil temperature rise rubber bag 22) and the weight 24 can suppress oscillation of a liquid surface in the tank and prevent sloshing. This point is described in detail by using an oscillating portion model diagram in FIG. 5B.

Figure 5B:
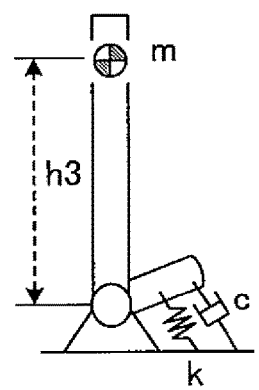
FIG. 5B is a model diagram in the case where an oscillating portion of the hydraulic oil tank for the power generation system according to Embodiment 2 of the present invention is an oscillating system with one degree of freedom.

As illustrated in FIG. 5B, an oscillating portion of the hydraulic oil tank 20 in FIG. 5A can be handled as a general oscillating system with one degree of freedom. Specifically, a damping ratio $\zeta$ can be expressed as $\zeta=(c/2)\cdot(k\cdot m\cdot h_3^2)^{1/2}$, where m [kg] is the mass of the weight 24 and the oscillating portion of the tank (portion above the oil temperature drop rubber bag 23), h3 [m] is the height from the oil temperature drop rubber bag 23 to the center of gravity of the tank, k [Nm/rad] is the stiffness of the oil temperature drop rubber bag 23 determined from the material and shape of the oil temperature drop rubber bag 23, and c [Nm·sec/rad] is a damping coefficient. In the embodiment, oscillation can be suppressed by setting the damping ratio $\zeta$ to 0.5 or more.

Moreover, the inside of the hydraulic oil tank 20 communicates with the hydraulic drive train via a suction pipe 21a and a return pipe 21b which are connected to the tank wall surface 21 as circulation routes of the hydraulic oil (although description of this configuration is omitted in Embodiment 1, the same applies to Embodiment 1). As illustrated by single-headed solid arrows in FIG. 5A, the hydraulic oil in the hydraulic oil tank 20 is sucked into the hydraulic drive train through the suction pipe 21a and returns to the hydraulic oil tank 20 through the return pipe 21b. The suction pipe 21a and the return pipe 21b are attached below the oil temperature drop rubber bag 23 (on a pod wall surface 25 side).

Attaching the suction pipe 21a and the return pipe 21b below the oil temperature drop rubber bag 23 as described above makes it less likely for the suction pipe 21a and the return pipe 21b to oscillate. Moreover, even if air bubbles are mixed into the hydraulic oil in the hydraulic oil tank 20, the air bubbles are less likely to be mixed into the hydraulic oil flowing through the pipes 21a, 21b because the air bubbles tend not to stay in a lower portion.

Moreover, the bottom surface 21e of the hydraulic oil tank 20 is in tight contact with the inner side of the pod wall surface 25 or is part of the inner side of the pod wall surface 25. This point is described in detail by using FIGS. 6 and 7.

Figure 6:
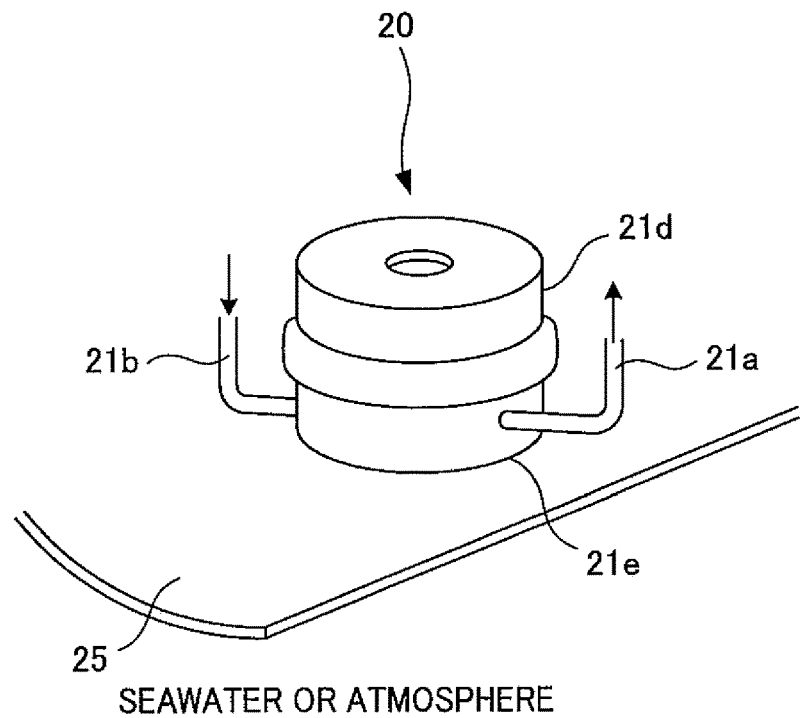
FIG. 6 is a perspective view for explaining an arrangement of the hydraulic oil tank for the power generation system according to Embodiment 2 of the present invention.

FIG. 6 is a perspective view for explaining arrangement of the hydraulic oil tank 20. As illustrated in FIG. 6, the pod wall surface 25 is curved and the bottom surface 21e of the hydraulic oil tank 20 has a shape corresponding to this curve and is in tight contact with the inner side of the pod wall surface 25. Alternatively, the a contact portion of the side surface 21d with the inner side of the pod wall surface 25 has a shape corresponding to this curve and the bottom surface 21e is used as part of the inner side of the pod wall surface 25.

The outer side of the pod wall surface 25 is in contact with seawater or the atmosphere. When the hydraulic oil in the hydraulic oil tank 20 is circulated to the hydraulic drive train to be heated and then returns to the hydraulic oil tank 20, the heat can be efficiently dissipated from the bottom surface 21e to the seawater or the atmosphere, and the hydraulic oil tank 20 and the hydraulic oil can be effectively cooled. Note that, since the suction pipe 21a and the return pipe 21b are attached to the lower (pod wall surface 25) side of the hydraulic oil tank 20 as described above, a cooler portion of the hydraulic oil in the hydraulic oil tank 20 is circulated to the hydraulic drive train via the pipe.

Circulating the cooled hydraulic oil to the hydraulic drive train as described above prevents high temperature and abnormal temperature rise, which cause device failure, from occurring in various system devices in the pod such as the hydraulic oil tank 20 and the hydraulic drive train and improves reliability. Moreover, utilizing the heat exchange with the seawater or the atmosphere via the pod wall surface 25 makes additional provision of a new cooling system unnecessary, thereby leading to reduction in weight and cost of the system.

Figure 7:
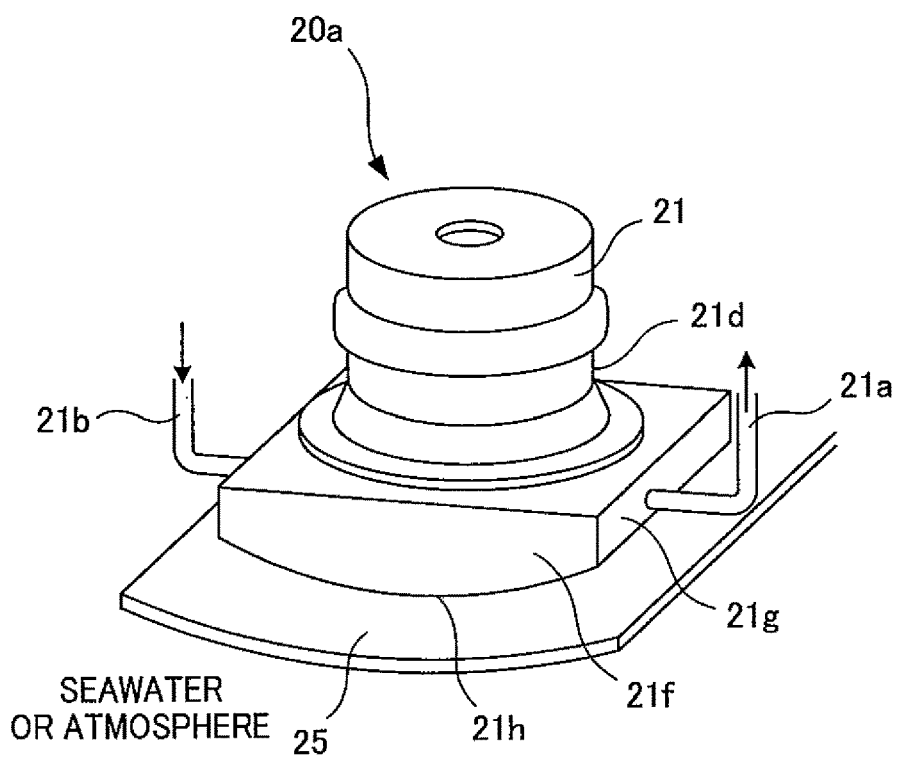
FIG. 7 is a perspective view for explaining an arrangement of a modified example of the hydraulic oil tank for the power generation system according to Embodiment 2 of the present invention.

FIG. 7 is a perspective view for explaining a hydraulic oil tank 20a. As illustrated in FIG. 7, the hydraulic oil tank 20a has an enlarged diameter portion 21f below the tank wall surface 21, that is in a portion including a contact portion with the inner side of the pod wall surface 25. The enlarged diameter portion 21f is a portion in which the side surface 21d is formed larger in a radial direction than in the other portion. Note that it is only necessary that the enlarged diameter portion 21f has an enlarged diameter, and the enlarged diameter portion 21f is not limited to the shape illustrated in FIG. 7.

Like the side surface 21d and the bottom surface 21e described above, a bottom surface 21h of the enlarged diameter portion 21f has a shape corresponding to the aforementioned curve and is in tight contact with the inner side of the pod wall surface 25. Alternatively, a contact portion of a side surface 21g of the enlarged diameter portion 21f with the inner side of the pod wall surface 25 has a shape corresponding to the curve and the bottom surface 21*h* is used as part of the inner side of the pod wall surface 25.

Moreover, the suction pipe 21*a* and the return pipe 21*b* are connected to the enlarged diameter portion 21*f* and, as described above, a cooler portion of the hydraulic oil in the hydraulic oil tank 20*a* is thereby circulated to the hydraulic drive train via the pipe.

As described above, in the hydraulic oil tank 20*a*, the cooling performance can be further improved by increasing the contact area between the bottom surface and the pod wall surface 25.

Note that, the oil temperature rise rubber bag 22 and the oil temperature drop rubber bag 23 described in the embodiment may have bellows-like shapes corresponding to the oil temperature rise bellows 12*a* and the oil temperature drop bellows 13*a* in Embodiment 1. Furthermore, the above description relating to the cooling and made by using FIGS. 6 and 7 can be applied to other embodiments.

Embodiment 3

Figure 8:
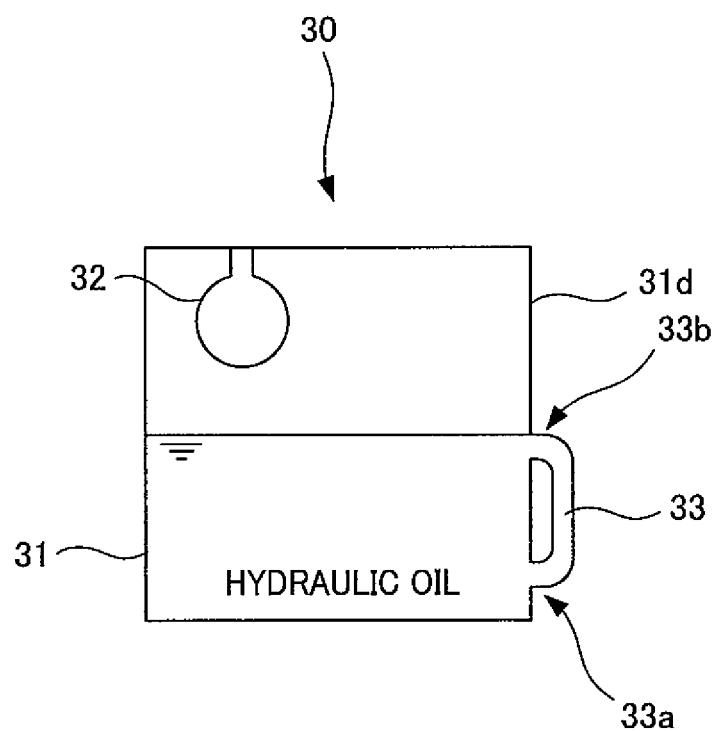
FIG. 8 is a schematic cross-sectional diagram of a hydraulic oil tank for a power generation system according to Embodiment 3 of the present invention.

FIG. 8 is a schematic cross-sectional diagram of a hydraulic oil tank (hydraulic oil tank 30) for a power generation system according to Embodiment 3. Note that FIG. 8 illustrates a state in the middle of sealing of the hydraulic oil, and the suction pipe and the return pipe are omitted as in Embodiment 1.

The hydraulic oil tank 30 includes an oil temperature rise rubber bag 32 and an oil temperature drop rubber bag 33 on a tank wall surface 31. The oil temperature rise rubber bag 32 is the same as the oil temperature rise rubber bag 12 in Embodiment 1.

The oil temperature drop rubber bag 33 corresponds to the oil temperature drop rubber bag 13 in Embodiment 1. However, in the embodiment, the oil temperature drop rubber bag 33 has a tubular shape and is disposed on a side surface 31*d* of the tank wall surface 31. The oil temperature drop rubber bag 33 has a first end portion 33*a* (second opening) and a second end portion 33*b* (third opening) which pass through the side surface 31*d* and the second end portion is attached above the first end portion 33*a* in a vertical direction. The oil temperature drop rubber bag 33 communicates with the inside of the tank wall surface 31.

In the hydraulic oil tank 30, the oil temperature rise rubber bag 32 and the oil temperature drop rubber bag 33 thus operate like the oil temperature rise rubber bag 12 and the oil temperature drop rubber bag 13 in Embodiment 1. In addition, in the sealing of the hydraulic oil, as the liquid level of the hydraulic oil rises, the hydraulic oil enters the inside of the oil temperature drop rubber bag 33 from the first end portion 33*a* and the gas phase is discharged from the second end portion 33*b*. This facilitates discharge of the gas phase included in the oil temperature drop rubber bag 33 from the second end portion 33*b*, and the inside of the oil temperature drop rubber bag 33 can be easily filled with the hydraulic oil without air accumulation being formed in the oil temperature drop rubber bag 33.

Thus, there is no gas phase in the hydraulic oil tank 30 (including the inside of the oil temperature drop rubber bag 33) and sloshing of the hydraulic oil can be thereby prevented even when, for example, oscillation occurs. Note that the oil temperature rise rubber bag 32 and the oil temperature drop rubber bag 33 described in the embodiment may have bellows-like shapes corresponding to the oil temperature rise bellows 12*a* and the oil temperature drop bellows 13*a* in Embodiment 1.

INDUSTRIAL APPLICABILITY

The present invention is suitable as a hydraulic oil tank for a power generation system and as a method of sealing hydraulic oil in the hydraulic oil tank.

The invention claimed is:

1. A hydraulic oil tank which stores hydraulic oil, comprising:
a first expanding-shrinking portion attached to a tank wall surface from an inner side of the tank wall surface and having a first internal space communicating with an outside of the tank wall surface through a first opening passing through the tank wall surface, the first expanding-shrinking portion separating the first internal space and an inside of the tank wall surface from each other while being able to expand and shrink; and
a second expanding-shrinking portion attached to the tank wall surface from an outer side of the tank wall surface and having a second internal space communicating with the inside of the tank wall surface through a second opening passing through the tank wall surface, the second expanding-shrinking portion separating the second internal space and the outside of the tank wall surface from each other while being able to expand and shrink.

2. The hydraulic oil tank according to claim 1, wherein the first expanding-shrinking portion and the second expanding-shrinking portion are rubber bags having the first opening and the second opening, respectively.

3. The hydraulic oil tank according to claim 2, wherein the second expanding-shrinking portion is disposed in a side surface portion of the tank wall surface and has a tubular shape,
one end of the second expanding-shrinking portion is the second opening passing through one location of the side surface portion, and
the other end of the second expanding-shrinking portion is a third opening passing through another location of the side surface portion shifted from the one end of the second expanding-shrinking portion in a vertical direction of the tank wall surface.

4. The hydraulic oil tank according to claim 2, wherein the second expanding-shrinking portion is disposed as part of a side surface portion of the tank wall surface and the second opening is formed to extend along an entire periphery of the side surface portion.

5. The hydraulic oil tank according to claim 4, wherein a weight is provided in an upper portion of a tank ceiling.

6. The hydraulic oil tank according to claim 1, wherein the first expanding-shrinking portion and the second expanding-shrinking portion are bellows having the first opening and the second opening, respectively.

7. The hydraulic oil tank according to claim 6, wherein the second expanding-shrinking portion is disposed in a side surface portion of the tank wall surface and has a tubular shape,
one end of the second expanding-shrinking portion is the second opening passing through one location of the side surface portion, and
the other end of the second expanding-shrinking portion is a third opening passing through another location of the side surface portion shifted from the one end of the second expanding-shrinking portion in a vertical direction of the tank wall surface.

8. The hydraulic oil tank according to claim 6, wherein the second expanding-shrinking portion is disposed as part of a side surface portion of the tank wall surface and the second opening is formed to extend along an entire periphery of the side surface portion.

9. The hydraulic oil tank according to claim 8, wherein a weight is provided in an upper portion of a tank ceiling.

10. The hydraulic oil tank according to claim 1, wherein the first expanding-shrinking portion is a first tubular body in which a first piston separates an air chamber, being the first internal space communicating with the outside through the first opening, from an oil chamber communicating with the inside of the tank wall surface through a fifth opening passing through the tank wall surface, and the second expanding-shrinking portion is a second tubular body in which a second piston separates an oil chamber, being the second internal space communicating with the inside of the tank wall surface through the second opening, from an air chamber communicating with the outside through a sixth opening passing through the tank wall surface.

11. The hydraulic oil tank according to claim 1, wherein the hydraulic oil tank is disposed in a pod of the power generation system, and a tank bottom surface is in tight contact with a wall surface of the pod or is part of the wall surface of the pod.

12. The hydraulic oil tank according to claim 11, wherein a portion including the tank bottom surface is an enlarged diameter portion having a diameter larger than that in other portions of the hydraulic oil tank.

13. The hydraulic oil tank according to claim 12, wherein a pipe which is a circulation route of the hydraulic oil is connected to the enlarged diameter portion.

14. A hydraulic oil sealing method wherein the method comprises sealing hydraulic oil with the second expanding-shrinking portion of the hydraulic oil tank according to claim 2 being crushed from the outside or evacuated.

* * * * *